Dec. 19, 1939.   G. R. CUNNINGTON   2,184,140
LAMINATED THERMOPLASTIC INSULATION MATERIAL
Filed Feb. 23, 1937
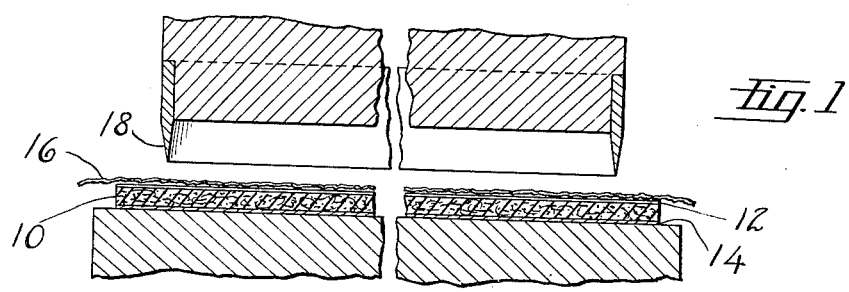
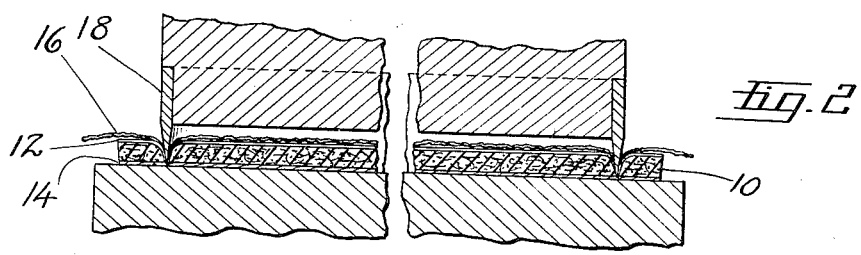
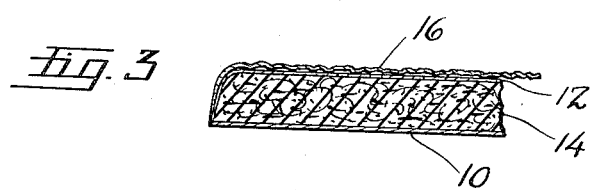
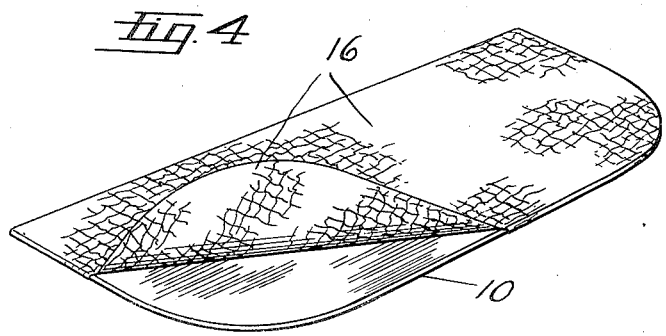
INVENTOR.
GEORGE R. CUNNINGTON
BY
Parker & Burton
ATTORNEYS.

Patented Dec. 19, 1939

2,184,140

UNITED STATES PATENT OFFICE 2,184,140

LAMINATED THERMOPLASTIC INSULATION MATERIAL

George R. Cunnington, Detroit, Mich., assignor to Woodall Industries Incorporated, Detroit, Mich., a corporation of Michigan Application February 23, 1937, Serial No. 127,034

10 Claims. (Cl. 154—2)

My invention relates to an improved sheet of thermoplastic insulation material and to improvements in the process of manufacturing the same. It pertains generally to the structure described in my application Serial No. 76,105, filed April 24, 1936.

An object is to provide a sheet of material having a finished surface, preferably a laminated sheet of thermoplastic insulation material having a finish lamination, provided with a removable lamination serving as a temporary cover for the finished surface. My invention relates not only to such a sheet as a structure but to an improved, simple, inexpensive method of fabricating such a structure.

One large commercial use for thermoplastic insulation sheet material of the character described in my patent application aforesaid is as a covering for the metal floor of an automobile body. One particular section of the floor so covered is a trunk compartment or a rear deck compartment where one surface of the thermoplastic insulation sheet is normally exposed. For this use the thermoplastic insulation sheet material is provided with a tough wear resistant lamination which is given a suitable finish for its exposed use.

An object of this particular type of sheet is that it may be applied to the floor of the vehicle body prior to the finishing of the body and it may be adhesively secured in position during the heat treatment which accompanies such finishing of the body. In the spray painting of the body paint will frequently get into the interior and spatter upon the exposed finished surface of the sheet. If this occurs the exposed surface of the sheet presents an undesirable appearance. As it is customary to provide such sheet material in one color only and as this material goes into bodies which are painted many different colors, it is readily apparent how it would be undesirable to have these different colors spattered over the top of the insulation sheet.

Different methods have been suggested for protecting this finished surface during the painting of the body. One method is to provide shields which are removably placed over the insulation sheet as temporary protective covers therefor.

It is desirable, however, to provide such protection without appreciable addition to the cost of the sheet or to the cost of its adhesive attachment to the floor and without interfering with the desired carrying out of such adhesive attachment.

If shields are provided the cost of the large number of shields required for commercial body production, the work of installing the shields and removing them and transporting them from one place to another for use and storing them when not in use add appreciably to the cost of manufacture of the bodies.

It has been found, however, that such a sheet may be effectively protected at little additional cost and without adding to the cost of adhesive attachment by providing the sheet with a removable temporary cover layer of flexible extensible materials such as crepe paper stretched over one surface of the sheet and adhesively secured to the edges of the sheet. Such adhesive securement to the edges of the sheet may be obtained during the die cutting of the sheet to the required size and shape to fit the floor to be covered thereby and without addition to the cost of such die cutting operation.

A sheet so provided with its temporary cover layer may be delivered, stored, transported, and adhesively applied to the floor as conveniently and as simply as would be the case if such temporary cover layer were not provided. Following the painting of the body such temporary cover layer may be readily removed and scrapped. It completely protects the finished surface of the sheet during the painting of the body and does not interfere in any way with the desired adhesive securement of the sheet to the body and does not add appreciably to the cost of the sheet or the method of its use.

Other objects, advantages, and meritorious features of my invention will more fully appear from the following specification, appended claims, and accompanying drawing, wherein:

Figure 1 is a cross-sectional view through conventional apparatus and a sheet embodying my invention preparatory to the die cutting of the sheet, Fig. 2 is a cross sectional view taken on the same line as Fig. 1 illustrating the die cutting of the sheet, Fig. 3 is an enlarged fragmentary sectional view showing the sheet structure along one edge, and Fig. 4 is a perspective of a sheet embodying my invention and showing the temporary cover partially withdrawn.

The sheet material of the character which forms the basis of the application hereinabove referred to and which is adapted for use as a floor covering for the sheet metal floor of an automobile body is generally fabricated as a continuous process wherein the sheet material is run out in a long strip and cut to size to form the desired size and shape of the sheet for use on the vehicle.

A suitable sheet structure is one wherein there is a relatively thick lamination of asphaltic fibrous mastic. This mastic may be made up of relatively short lengths of cord fibers such as result from the reclaiming of automobile tires mixed with asphalt wherein the asphalt may constitute approximately 80% by weight of the mass with the fiber stock constituting approximately 20% by weight of the mass. These proportions may be varied if desired. This particular application does not relate to the formation of this mastic layer as such is described and claimed in my aforesaid earlier filed application.

This mastic layer is preferably provided with a finished surface which may take the form of a lamination of material which is relatively non-tacky and yet which is sufficient thermoplastic to be capable of being embossed and permanently retaining such embossed shape particularly when combined with the mastic layer itself. This may be an asphalted felt sheet or a latex saturated cellulose sheet such as Lexide, and it is secured to the mastic lamination during the manufacture thereof.

The mastic mass is made up in a mixing vat and passed through an extruding machine and then between calender rolls and the protective finish lamination is run on and compacted thereagainst and adhere thereto likewise between these calender rolls and after the sheet has cooled somewhat and as it passes along as a continuous strip it is die cut to the proper size and shape.

As described in my application, Serial No. 119,383, filed Jan. 7, 1937, a thin porous film-like sheet of crepe paper may be applied to the side of the mastic lamination opposite the protective lamination above referred to and for the purposes described in my said application Ser. No. 119,383. In the drawing of the instant application the mastic lamination is indicated as 10. The protective surface lamination which may be an asphalted sheet or Lexide as above stated is indicate as 12. The thin porous tissue layer is indicated as 14. This laminated sheet is cut to the desired size and shape to fit the floor area upon which it is to be used.

In the finishing of the automobile bodies such sheet is placed loosely upon the floor section to be covered thereby prior to passing the body through the heat treatment in the finishing of the body. This heat treatment may continue for thirty minutes to an hour. The temperature may vary from 200° to 240° F. The melting point of the asphalt is such that at this temperature asphalt drains down and self-adhesion of the sheet to the floor occurs. During the finishing of the body the exterior thereof is paint sprayed and a certain amount of paint may enter the interior and if it spatters upon this finished surface of the sheet it disfigures it. This is particularly true where the paint is of a different color.

The instant invention relates to the provision of this laminated mastic sheet with a protective cover sheet 16 as herein described. This protective cover sheet may be formed of crepe paper. It is not a film-like porous crepe sheet of the character of the sheet 14 but is a relatively strong tough flexible but extensible crepe sheet which is applied loosely over the laminated mastic sheet as shown in Fig. 1.

In the process of manufacture as hereinabove described this crepe sheet 16 is unrolled over the laminated mastic sheet as the same is advanced during its manufacture, but is not compacted thereagainst or adhered to the finish lamination 12 of such laminated mastic sheet. When the laminated mastic sheet with the protective surface layer 16 is brought to the die cutting machine a suitable cutting roll of any desired character such as 18 is pressed down through the laminated mastic sheet as shown in Fig. 2.

The extensible tough character of the cover sheet 16 causes the same to follow the cutting knife as it cuts through the mastic sheet and extend partially or completely over the cut edge of the mastic layer 10. The cover sheet 16 is urged against such cut edge of the mastic layer simultaneously with the cutting thereof and the adhesive character of this mastic layer under the pressure of the cover sheet 16 thereagainst causes such cover sheet to be adhesively secured to such cut edge. The cover sheet is not secured to the top surface of the mastic layer provided by the finish lamination 12. It lies loosely over such top surface. The extensibility of the covering sheet insures its following the cutting instrument over the cut edge of the mastic layer and its severance only after such drawing down thereover.

Fig. 3 shows a cover sheet 16 drawn down over the cut edge of the lamination 10 and adhered thereto. The same appears in Fig. 4.

After such sheet has been adhesively secured in place on the floor of the automobile body following the finishing of the body and after the body has been completely painted the cover sheet 16 may be grasped at one edge as shown in Fig. 4 and quickly removed and scrapped. This keeps the upper surface of the laminated insulation sheet completely clean and provides secure protection against discoloration during the finishing of the body.

What I claim:

1. A laminated sheet comprising an intermediate lamination of thermoplastic asphaltic fibrous mastic, a lamination of protective finish material overlying and secured to one surface of the mastic lamination, and a layer of flexible extensible fibrous material overlying the finish lamination and adhesively secured to the edge of the mastic lamination.

2. A laminated sheet comprising an intermediate lamination of thermoplastic asphaltic fibrous mastic, a lamination of protective finish material overlying and secured to one surface of the mastic lamination, and a layer of flexible extensible fibrous material overlying the finish lamination without adhesion thereto compacted against and adhesively secured to the edge of the mastic lamination by the adhesive nature of the mastic lamination.

3. A laminated sheet comprising an intermediate lamination of thermoplastic asphaltic fibrous mastic, a lamination of protective finish material overlying and secured to one surface of the mastic lamination, a layer of extensible non-adhesive cellulose material overlying the finish lamination without securement thereto compacted against and adhesively secured to the edge of the mastic lamination, and a lamination of non-adhesive porous cellulose material compacted against and adhesively secured to that surface of the mastic lamination opposite the finish lamination.

4. In combination with a sheet of asphaltic fibrous mastic having a finished surface and cut edges, a layer of flexible extensible protective material overlying said finished surface compacted against and adhesively secured to the cut edges of the mastic lamination.

5. A laminated sheet comprising a lamination of asphaltic mastic and a layer of crepe paper overlying one surface of the mastic lamination which it is desired to protect without securement thereto, said crepe paper being extended over the edges of the mastic lamination and compacted thereagainst and adhesively secured thereto.

6. A laminated sheet comprising an intermediate fibrous asphaltic lamination, a lamination of finish material adhesively secured over one surface thereof, a lamination of crepe paper adhesively compacted against and overlying the opposite surface thereof, and a layer of crepe paper overlying the finish lamination without adhesion thereto but extending over the edge of the mastic lamination and compacted thereagainst and adhesively secured thereto.

7. That method of fabricating a laminated sheet comprising forming a lamination of fibrous asphaltic mastic, adhesively compacting a lamination of relatively non-adhesive finish material to one surface of the mastic lamination, applying a layer of extensible crepe paper over said finish lamination, passing a cutting instrument through said paper lamination, finish lamination and mastic lamination extensibly drawing said paper lamination along by the cutting instrument over the cut edges of the finish lamination and mastic lamination compacting the paper layer against and adhesively securing the same to the cut edge of the mastic lamination and severing said paper lamination.

8. A laminated structure comprising a lamination of thermoplastic material having a tacky interior and a tacky edge, a lamination of extensible material overlying one surface of the first lamination which it is desired to protect without securement to said surface and drawn over said tacky edge of the first lamination and adhesively secured thereto.

9. That method of fabricating a laminated sheet comprising forming a lamination of material having a tacky interior, applying a layer of extensible material over one surface thereof, and forcing a cutter against said extensible layer and through said first lamination and simultaneously with the cutting thereof drawing said extensible layer along with the cutter over the cut edge of the first lamination adhesively compacting said layer against said cut edge.

10. That method of fabricating a laminated sheet comprising forming a lamination of material having a tacky interior as a continuous strip, applying a continuous strip of extensible material over one surface thereof, cutting laminated sheets from said two continuous strips and securing the laminations together by forcing a cutting instrument against said extensible lamination and through said first lamination drawing the extensible lamination along with the cutting instrument as it cuts through the first lamination over the cut edge of the first lamination adhesively compacting the extensible lamination against said cut edge of the first lamination and severing said extensible lamination.

GEORGE R. CUNNINGTON.